(12) United States Patent
Rouleau et al.

(10) Patent No.: US 12,398,828 B2
(45) Date of Patent: Aug. 26, 2025

(54) SLOTTED BOLT CLEAT BINDER

(71) Applicant: Panduit Corp., Tinley Park, IL (US)

(72) Inventors: Rodney G. Rouleau, Manhattan, IL (US); Joseph D. Cicero, Chicago, IL (US); Andrew W. Booth, Pickering (GB)

(73) Assignee: Panduit Corp., Tinley Park, IL (US)

( * ) Notice: Subject to any disclaimer, the term of this patent is extended or adjusted under 35 U.S.C. 154(b) by 46 days.

(21) Appl. No.: 18/385,170

(22) Filed: Oct. 30, 2023

(65) Prior Publication Data
US 2025/0137557 A1    May 1, 2025

(51) Int. Cl.
*F16L 3/137* (2006.01)
*F16L 3/12* (2006.01)

(52) U.S. Cl.
CPC ............. *F16L 3/137* (2013.01); *F16L 3/1215* (2013.01)

(58) Field of Classification Search
CPC ......... F16L 3/137; F16L 3/1215; F16G 11/12; A44B 11/125; B60P 7/0823; B60P 7/0846; B60P 7/0884; B60P 7/0892; B66D 3/26; B66D 1/28
USPC .......... 248/74.3; 24/269, 68 R, 19, 274 WB, 24/68 D, 279, 20 LS, 135 K
See application file for complete search history.

(56) References Cited

U.S. PATENT DOCUMENTS

| | | |
|---|---|---|
| 1,282,848 A | 10/1918 | Jones |
| 1,963,436 A | 6/1934 | Dumke |
| 2,403,828 A | 7/1946 | Rawlins et al. |
| 2,780,429 A | 2/1957 | Vainer |
| 3,416,763 A * | 12/1968 | Moreno ................. F16G 11/12 410/103 |
| 3,747,288 A * | 7/1973 | Grimelii ............. E04B 1/34347 52/149 |
| 3,754,733 A * | 8/1973 | Foster ..................... F16G 11/12 242/388.7 |
| 3,856,265 A * | 12/1974 | Foster ..................... F16G 11/12 52/157 |

(Continued)

FOREIGN PATENT DOCUMENTS

| | | |
|---|---|---|
| FR | 2271431 A1 | 12/1975 |
| FR | 2461382 A1 | 1/1981 |

(Continued)

OTHER PUBLICATIONS

Turn Buckle for Stainless Steel Strap manufactured by C. Roer, webpages, 6 pgs., https://www.strassenausstatter.de/produkt/schilderbefestigung/schilderschellen/spannbaender/spannschloss-fuer-edelstahlband/, retrieved from Internet on Oct. 25, 2023.

*Primary Examiner* — Christopher Garft
(74) *Attorney, Agent, or Firm* — James H. Williams; Christopher S. Clancy

(57) ABSTRACT

A cleat binder is used to secure cables for short circuit protection. The cleat binder includes a yoke, a slotted hex head bolt, a nut, and a strap. The slotted hex head bolt has a head and a slot extending through the bolt. The yoke includes a bottom with a front, a back, a first side, and a second side. Side walls extend from the first and second side of the bottom of the yoke. The slotted hex head bolt extends through openings in the side walls of the yoke. The nut secures the slotted hex head bolt on the yoke. The strap is fed through the slot of the slotted hex head bolt, wrapped around cables, and tensioned to secure the cleat binder to the cables.

14 Claims, 17 Drawing Sheets

(56) References Cited

U.S. PATENT DOCUMENTS

| | | | | |
|---|---|---|---|---|
| 3,988,007 | A | * | 10/1976 | Freiburger, Jr. .......... F16H 7/08 |
| | | | | 24/68 R |
| 4,546,524 | A | | 10/1985 | Kreft |
| 5,098,051 | A | | 3/1992 | Aldridge et al. |
| 6,322,279 | B1 | * | 11/2001 | Yamamoto .............. B60R 9/045 |
| | | | | 403/93 |
| 6,520,487 | B2 | * | 2/2003 | Crichton ................. F16G 11/12 |
| | | | | 256/49 |
| 8,191,208 | B2 | * | 6/2012 | Hanson ................... B60P 7/083 |
| | | | | 24/68 CD |
| 9,106,069 | B2 | | 8/2015 | Frizzell |
| 9,353,892 | B2 | | 5/2016 | Frizzell |
| 9,488,298 | B2 | | 11/2016 | Calvert |
| 9,551,438 | B2 | | 1/2017 | Frizzell |
| 2014/0325799 | A1 | | 11/2014 | Frizzell |

FOREIGN PATENT DOCUMENTS

| | | | |
|---|---|---|---|
| GB | 2604373 | A | 9/2022 |
| WO | 1982003618 | A1 | 10/1982 |
| WO | 2012018782 | A1 | 2/2012 |

\* cited by examiner

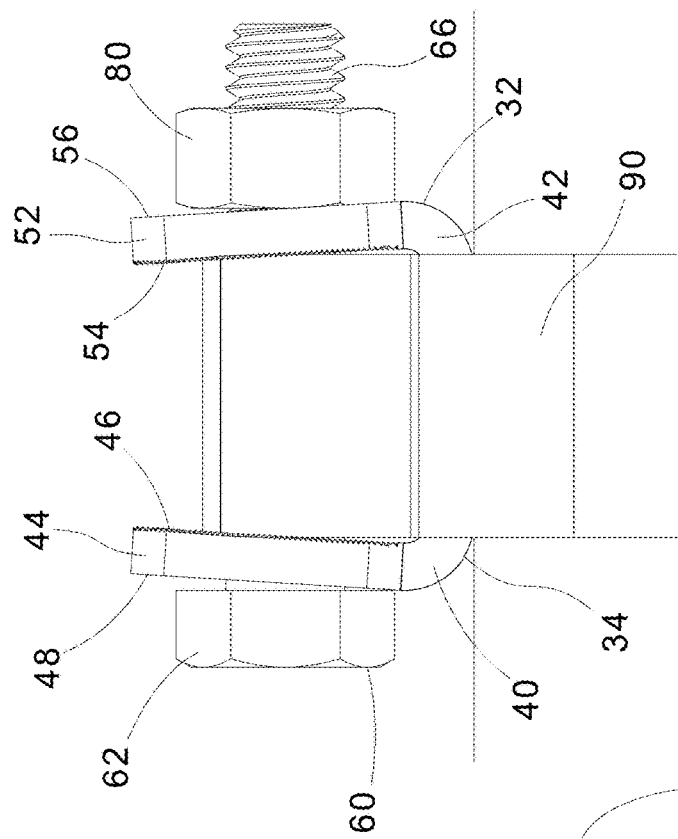
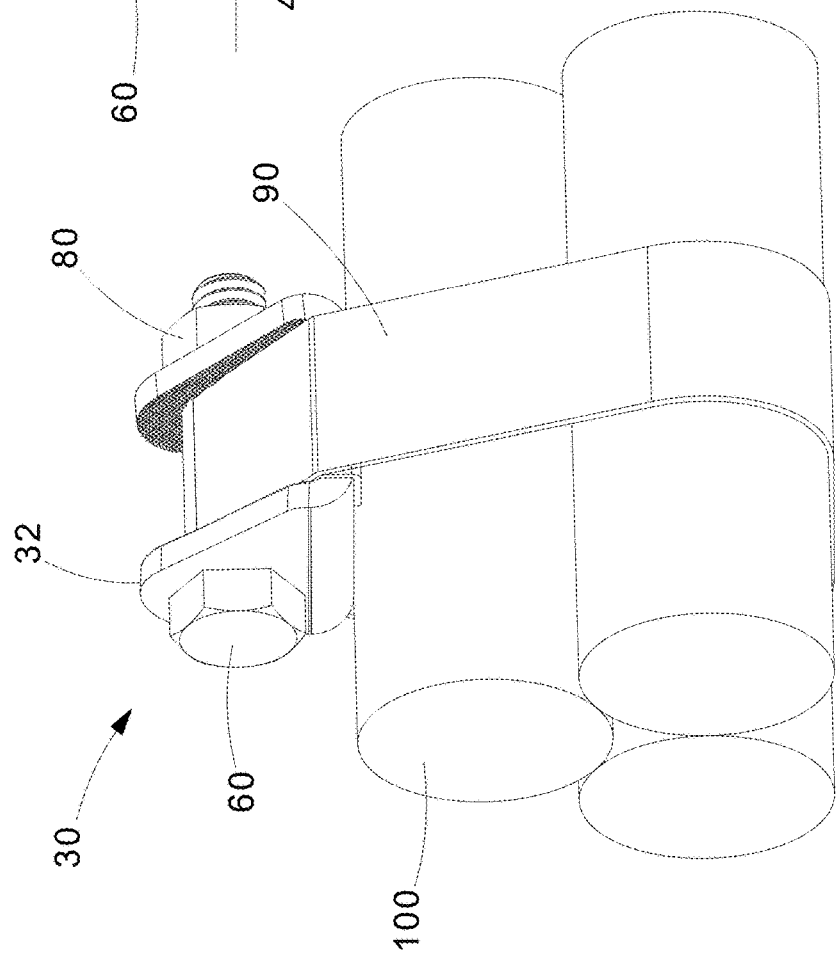

SLOTTED BOLT CLEAT BINDER

FIELD OF THE INVENTION

The present invention relates to strap cleat for short circuit protection, and more particularly to a slotted bolt cleat binder for short circuit protection.

BACKGROUND OF THE INVENTION

Conventional cable cleats have been typically used to secure wire or cable bundles to panels, ladder racks, or similar structural support members. The cable cleats include a mounting surface and a body portion that receives the wires or a cable bundle. It is also known to use MS 75 strap cleats to secure cables for short circuit protection. While the known cleats provide desirable characteristics for certain applications, they still have drawbacks and are capable of improvement. Conventional cable cleats are generally difficult and time consuming to install.

It is desirable to provide an improved strap cleat solution for short circuit protection that is lower in cost and easier to install. It is also desirable to provide a strap cleat solution that is flexible and accommodates a range of cable sizes.

SUMMARY OF THE INVENTION

The present invention is directed towards a cleat binder to secure cables and protect cables during short circuit events. The cleat binder includes a yoke, a slotted hex head bolt, a nut, and a strap. The slotted hex head bolt has a head and a slot extending through the bolt. The yoke includes a bottom with a front, a back, a first side, and a second side. A first side wall extends from the first side of the bottom and a second side wall extends from the second side of the bottom. The slotted hex head bolt extends through the yoke and the nut secures the slotted hex head bolt on the yoke. The strap is fed through the slot of the slotted hex head bolt and wrapped around the cables to secure the cleat binder to the cables.

BRIEF DESCRIPTION OF THE DRAWINGS

FIG. 1A is a perspective view of one embodiment of a slotted bolt cleat binder installed on a trefoil cable arrangement.

FIG. 1B is a front view of the slotted bolt cleat binder of FIG. 1A.

DETAILED DESCRIPTION

Figure 2:
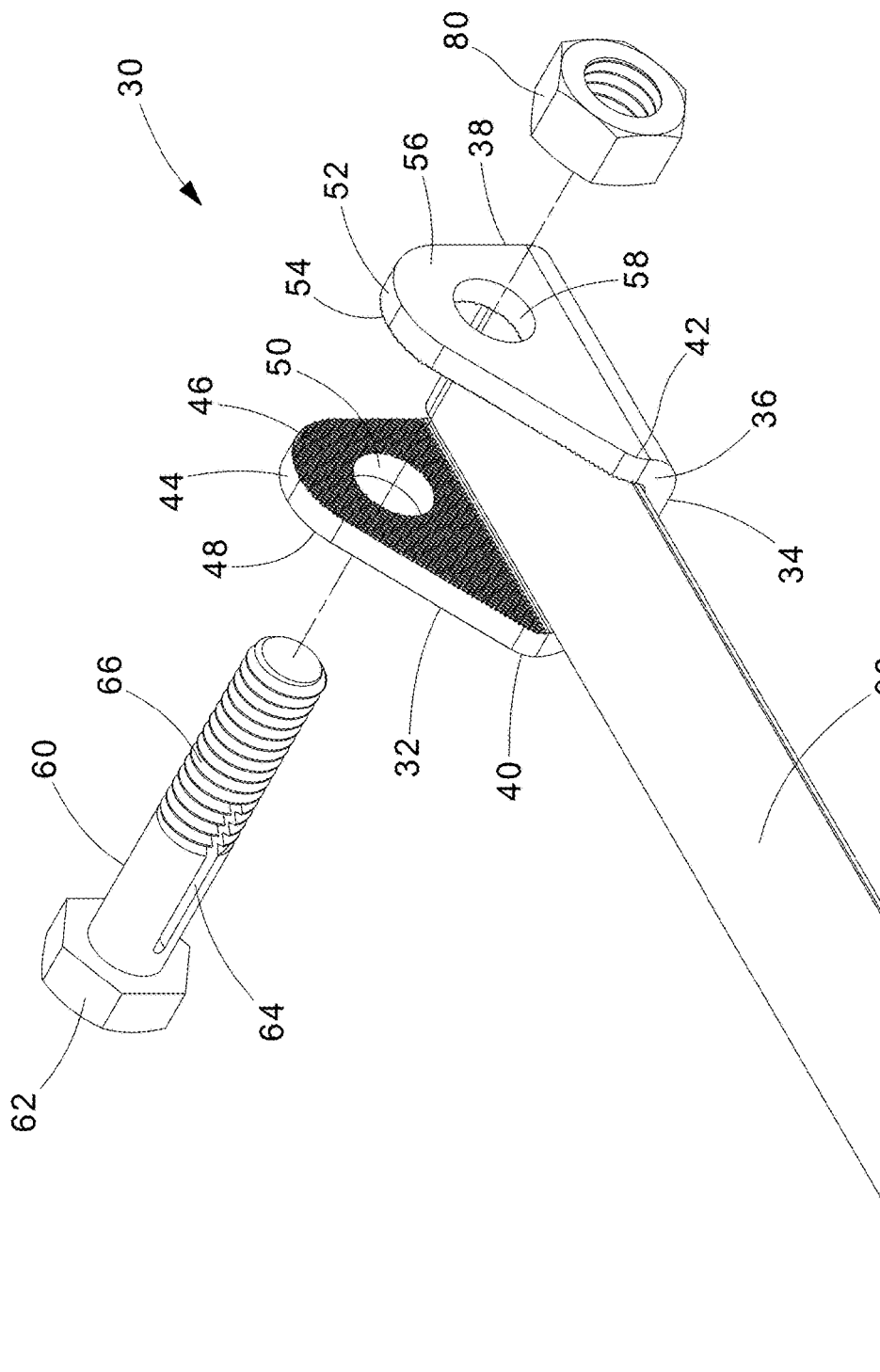
FIG. 2 is a partially exploded view of the slotted bolt cleat binder of FIG. 1A prior to installation.

FIGS. 1A-7 illustrate a first embodiment of the slotted bolt cleat binder 30 of the present invention. FIGS. 1A-1B illustrate the slotted bolt cleat binder 30 secured around a trefoil cable arrangement 100. As illustrated in FIG. 2, the slotted cleat binder 30 includes a yoke 32, a slotted hex head bolt 60, a hex nut 80, and a strap 90. The yoke 32 includes a bottom 34 having a front 36, a back 38, a first side 40 and a second side 42. A first side wall 44 extends from the first side 40 perpendicular to the bottom 34 and the second side wall 52 extends from the second side 42 perpendicular to the bottom 34. The side walls 44, 52 include inner walls 46, 54 with a cross knurling pattern and outer walls 48, 56, respectively. The first side wall 44 and the second side wall 52 each include an opening 50, 58 therethrough. The openings 50, 58 are aligned and are designed to receive the slotted hex head bolt 60.

The slotted hex head bolt 60 includes a hex head 62 at one end, a slot 64 through the bolt that extends half the length of the bolt 60, and threads 66 at the end opposite the head 62.

Figure 3:
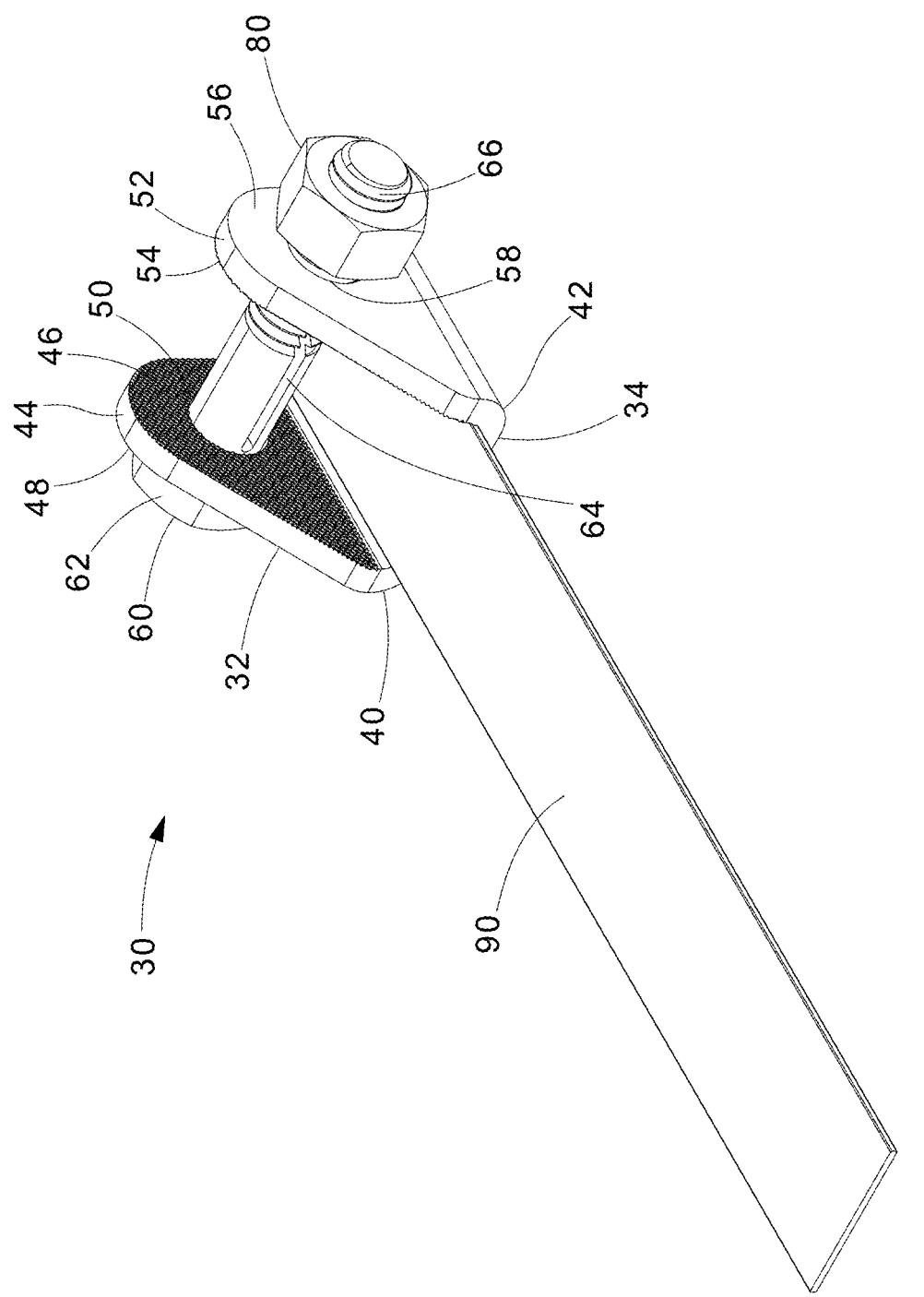
FIG. 3 is a perspective view of an assembled slotted bolt cleat binder of FIG. 2.
Figure 4B:
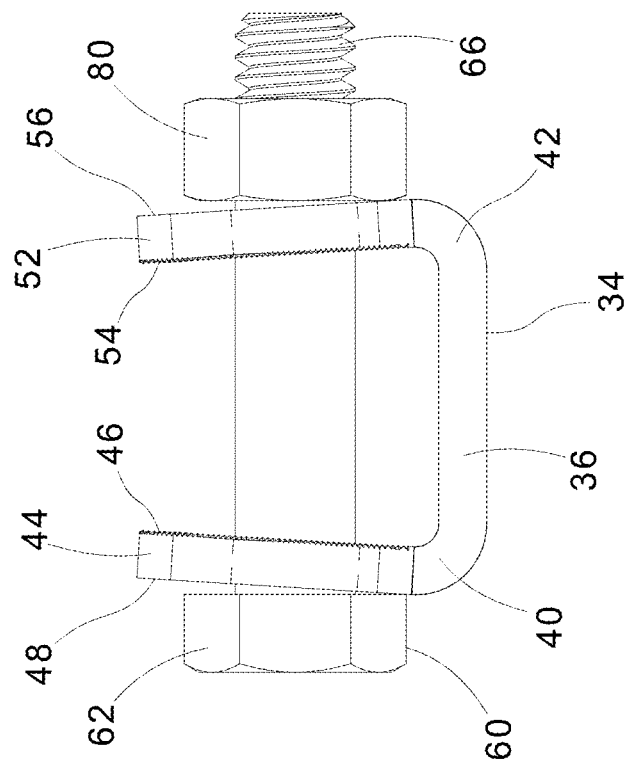
FIG. 4B is a front view of the assembled slotted bolt cleat binder of FIG. 4A with the fastener tightened.
Figure 4A:
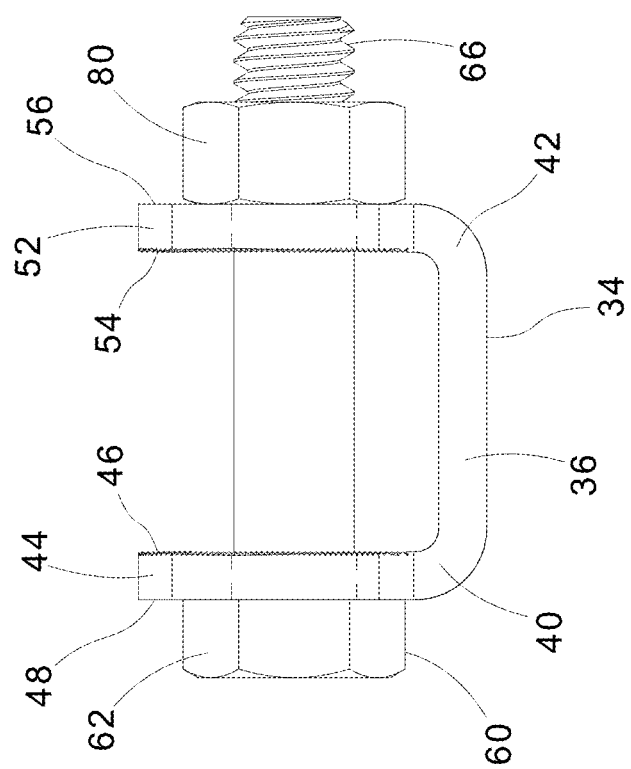
FIG. 4A is a front view of the assembled slotted bolt cleat binder of FIG. 2 without the strap.
Figure 5:
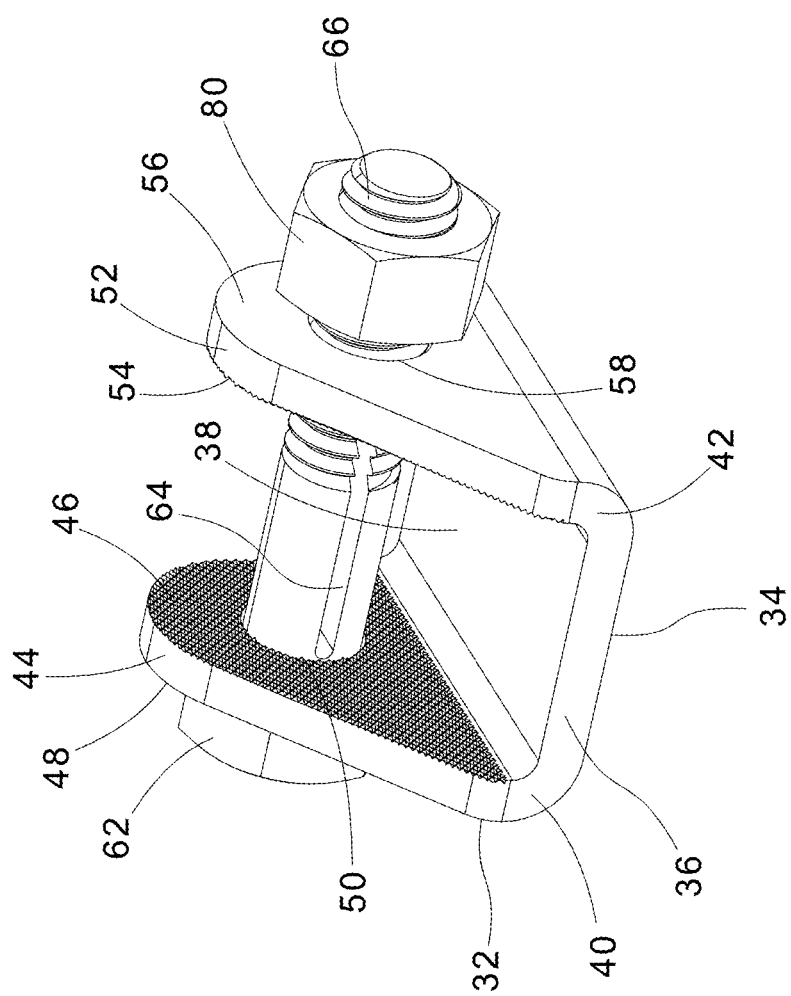
FIG. 5 is a front right perspective view of the slotted bolt cleat binder of FIG. 3 without the strap.
Figure 6:
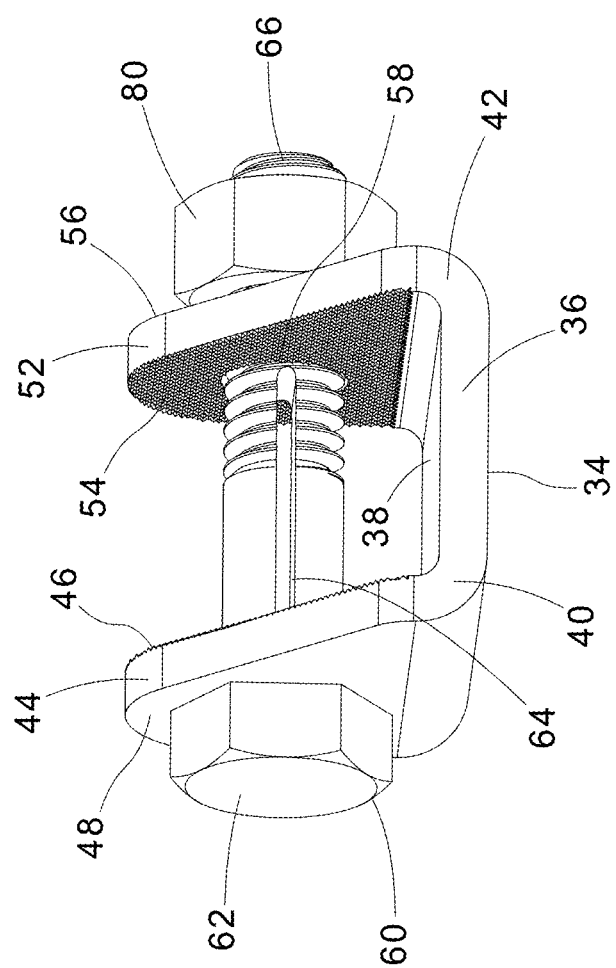
FIG. 6 is a front left perspective view of the slotted bolt cleat binder of FIG. 3 without the strap.

As illustrated in FIG. 3, once the slotted hex head bolt 60 has been installed through the openings 50, 58 in the side walls 44, 52, the hex nut 80 is threaded on the bolt 60. FIGS. 4A and 4B illustrate the slotted hex head bolt 60 installed in the yoke 32 without a strap 90. As the nut 80 is tightening, the side walls 44, 52 of the yoke 32 bend towards a center of the yoke 32 (see FIG. 4B). FIGS. 5 and 6 illustrate the inner wall 46, 54 of each side wall 44, 52, respectively, with the knurled surface.

Figure 7:
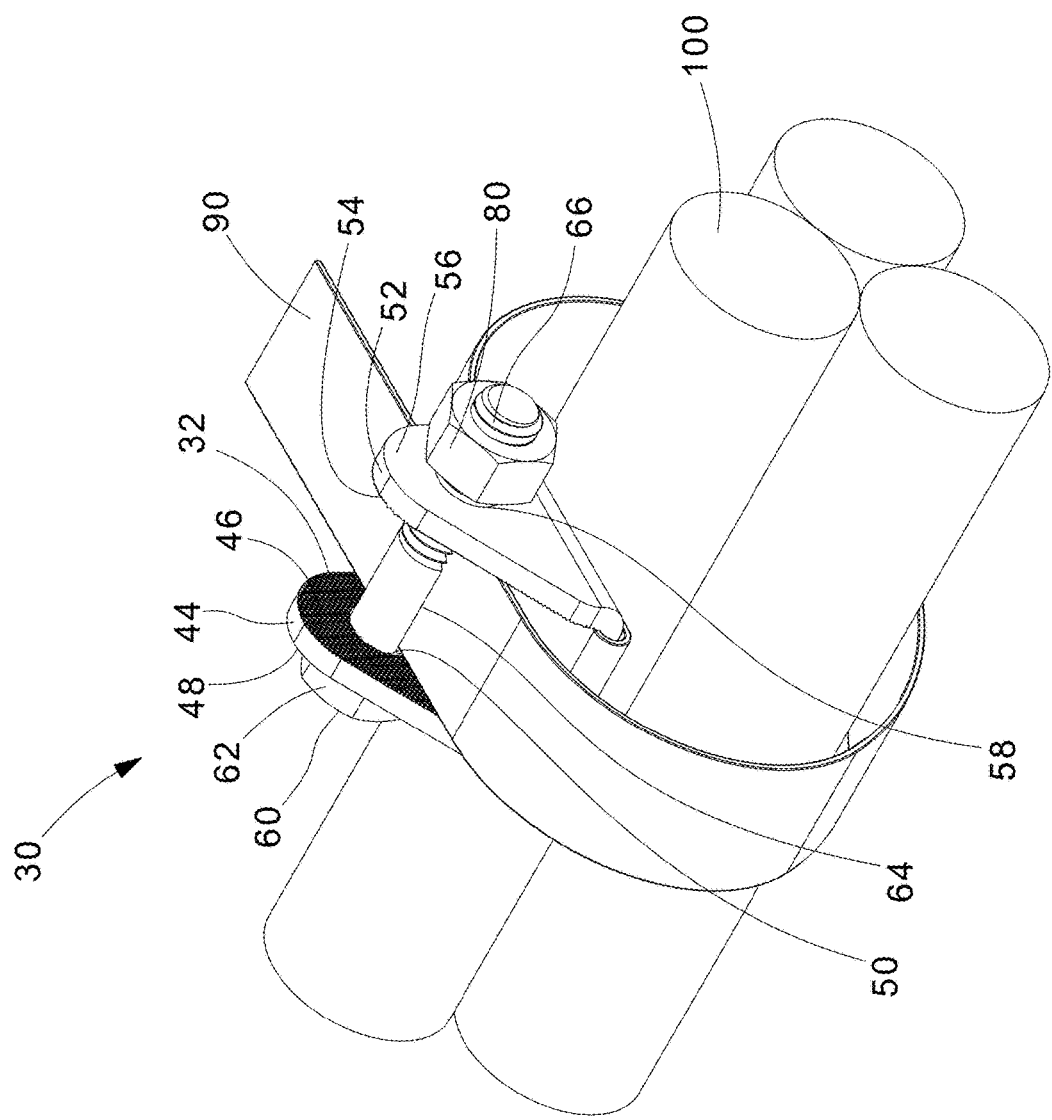
FIG. 7 is a perspective view of the slotted bolt cleat binder of FIG. 5 and a strap being installed around a trefoil cable arrangement.

To install the slotted bolt cleat binder 30, the cleat binder assembly 30 is positioned on a trefoil cable arrangement 100 or a cable bundle. The cleat binder 30 may also be positioned on a cushion sleeve (not illustrated) that has been wrapped around the cable or cable bundle. The strap 90 is wrapped around the trefoil cable arrangement 100 and threaded through the slot 64 in the slotted hex head bolt 60, as shown in FIG. 7. Using common tools, the slotted hex head bolt 60 is rotated to wrap the strap 90 around the slotted hex head bolt 60 to tension the strap 90.

Once the desired tension has been reached, the slotted hex head bolt 60 is held in a tensioned state and the nut 80 is tightened to complete the installation. The action of tightening the nut 80 locks the cleat binder 30 in a number of ways. The slotted hex head bolt 60 is held in place after tightening the nut 80 due to the friction between the hex head 62 of the bolt 60, nut 80, and outer walls 48, 56 of the side walls 44, 52 of the yoke 32. The tightening of the nut 80 also bends the side walls 44, 52 inward applying pressure to the edges of the strap 90 (see FIG. 1B). The inner walls 46, 54 of the side walls 44, 52 of the yoke 32 are knurled to further lock the strap 90 to the yoke 32 and prevent any movement during a short circuit event. The knurled inner walls 46, 54 lock the strap 90 by concentrating the force provided by the bolt 60 and nut 80 and deforming the strap material. The knurling on the inner walls 46, 54 may be a cross pattern or a straight pattern.

The slotted bolt cleat binder 30 includes a three-way locking system with the bolt 60 and nut 80, the strap 90 to the yoke 32, and the strap 90 to the knurls on the inside walls 46, 54. The slotted bolt cleat binder 30 is easily installed by common tools with gloves even in confined spaces. The slotted bolt cleat binder 30 receives various sized cables or cable bundles and is inexpensive to manufacture.

Figure 8:
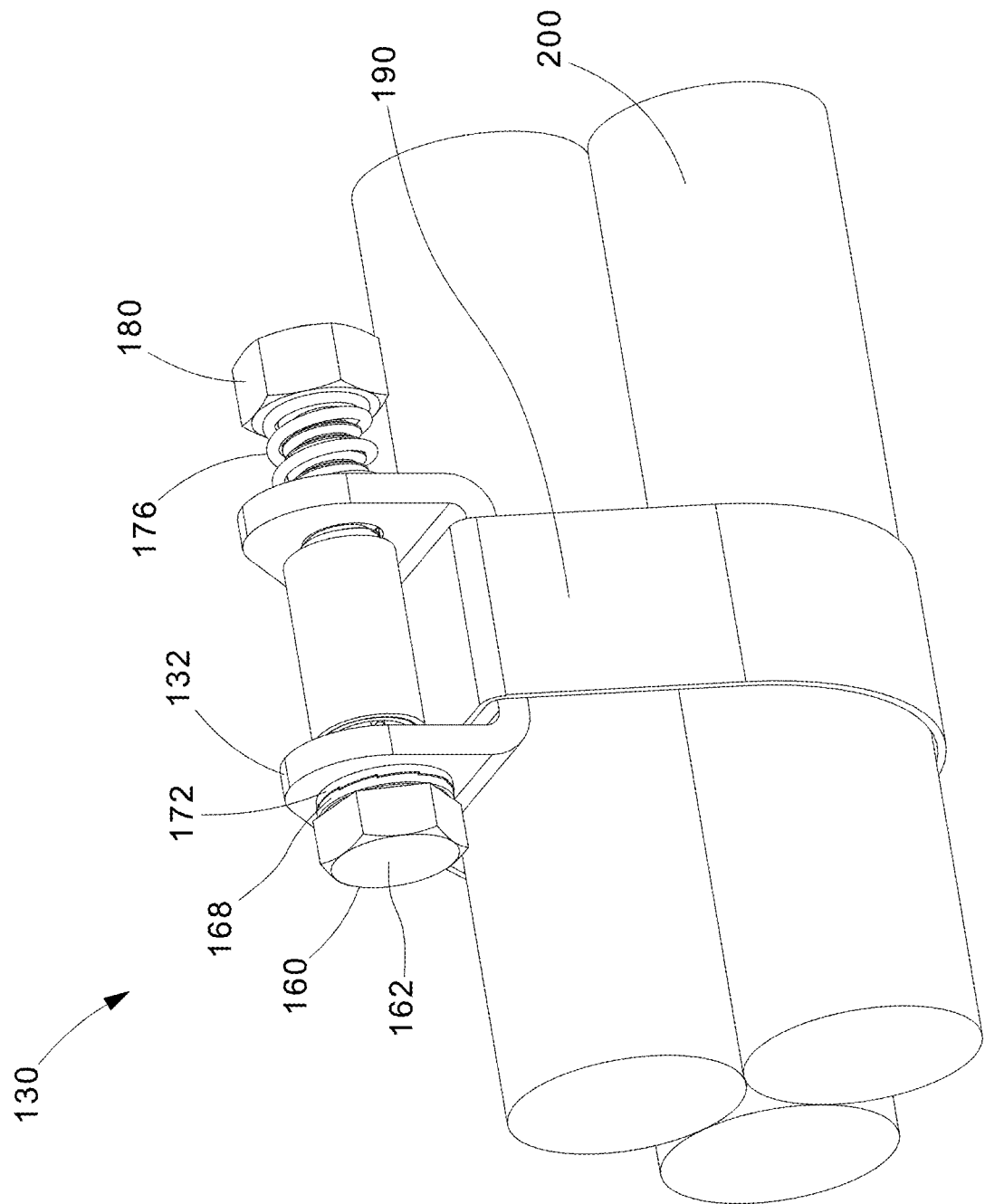
FIG. 8 is a perspective view of a second embodiment of a slotted bolt cleat binder installed on a trefoil cable arrangement.
Figure 9:
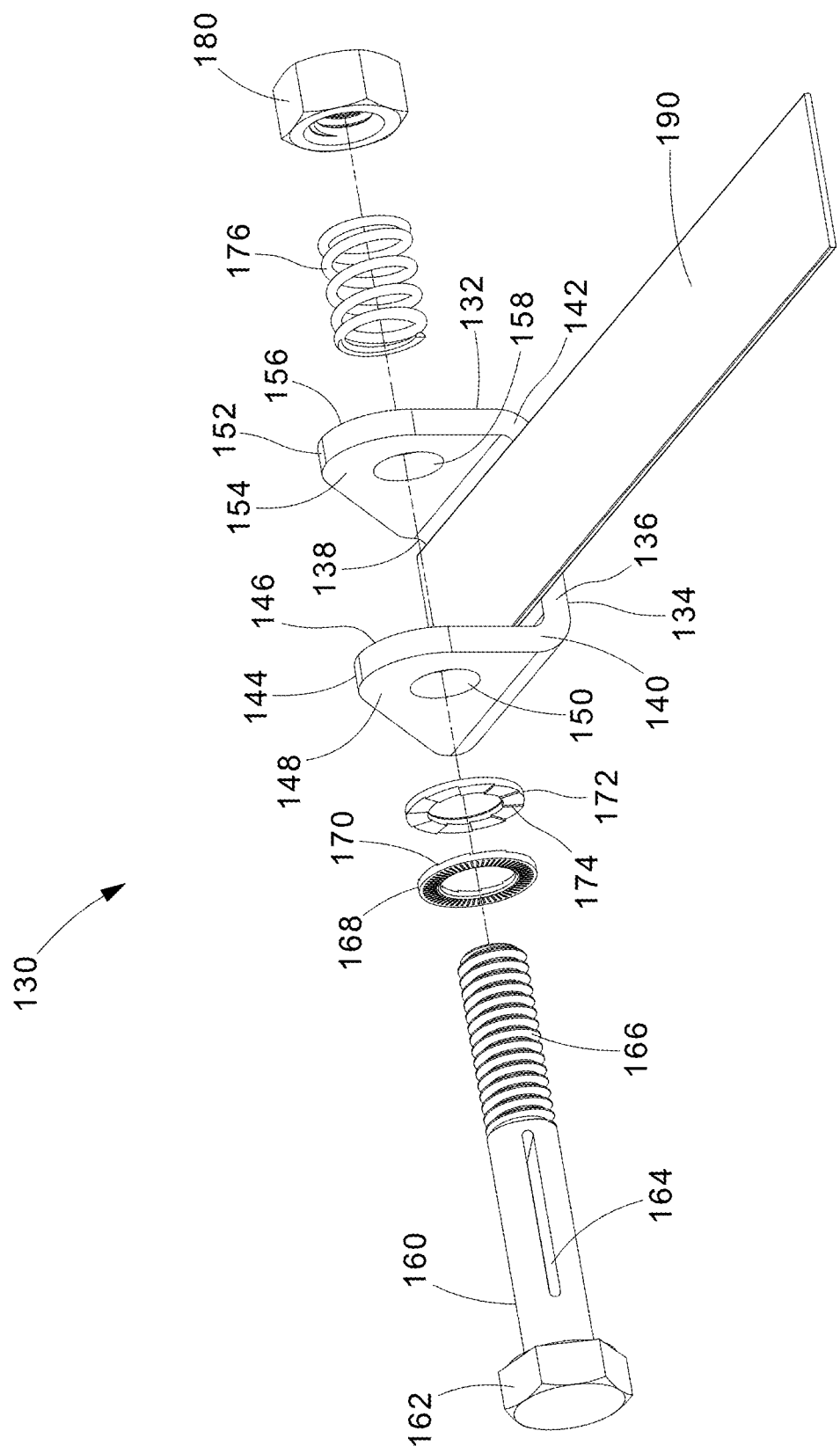
FIG. 9 is a partially exploded left perspective view of the slotted bolt cleat binder of FIG. 8.
Figure 10:
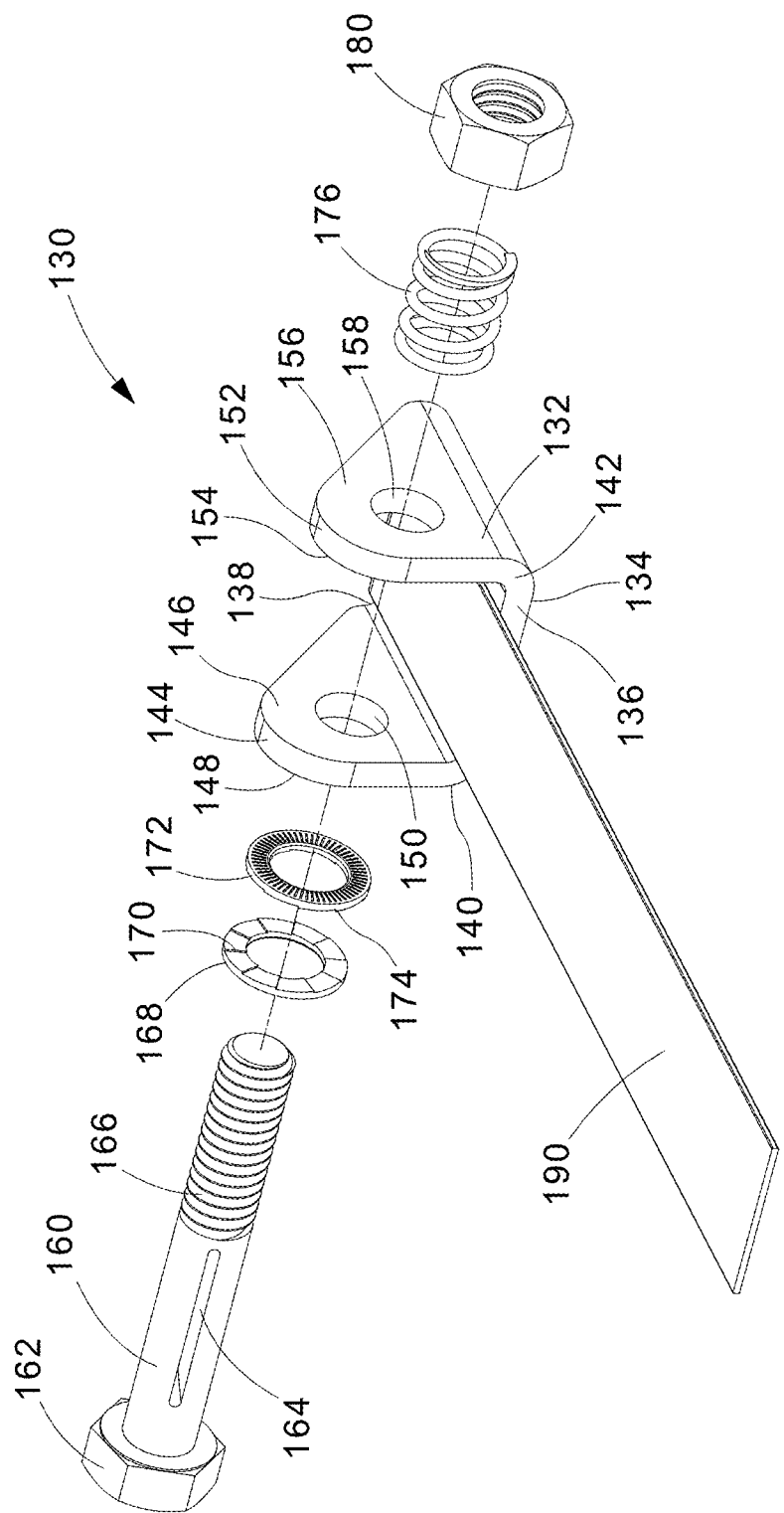
FIG. 10 is a partially exploded right perspective view of the slotted bolt cleat binder of FIG. 8.
Figure 11:
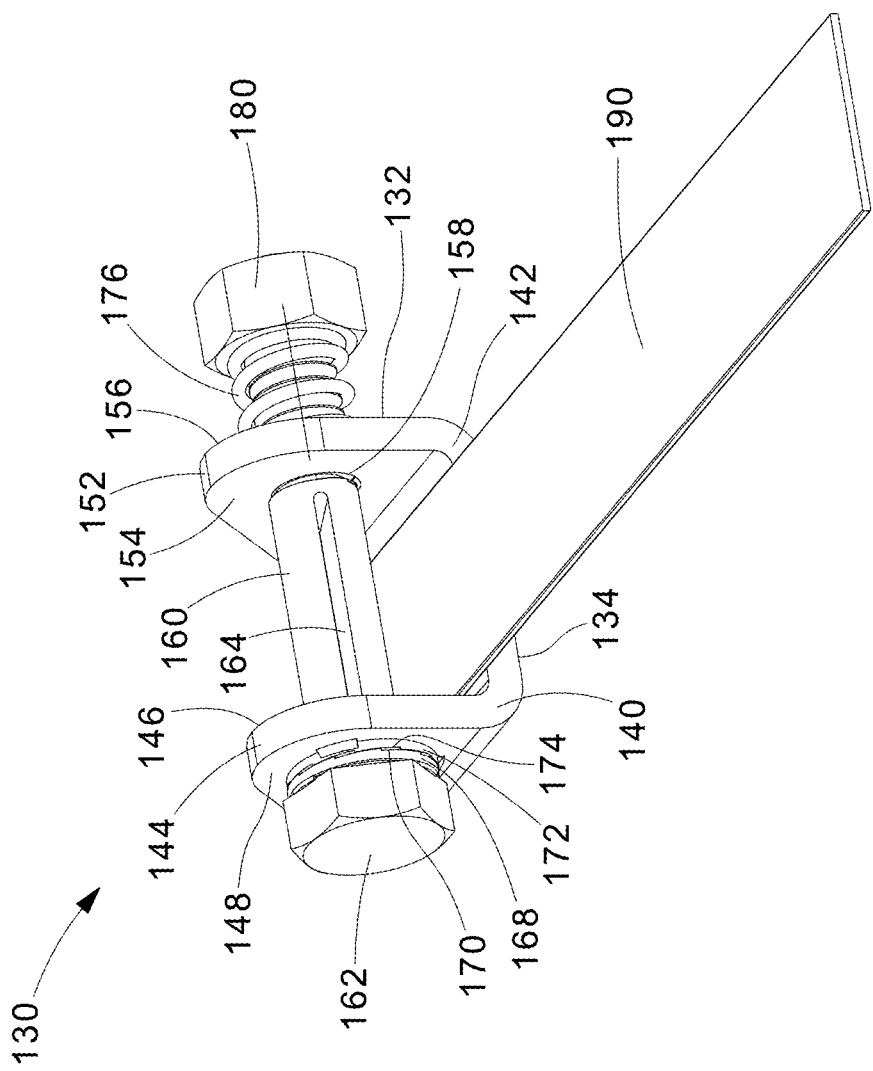
FIG. 11 is a perspective view of the slotted bolt cleat binder of FIG. 8.
Figure 12:
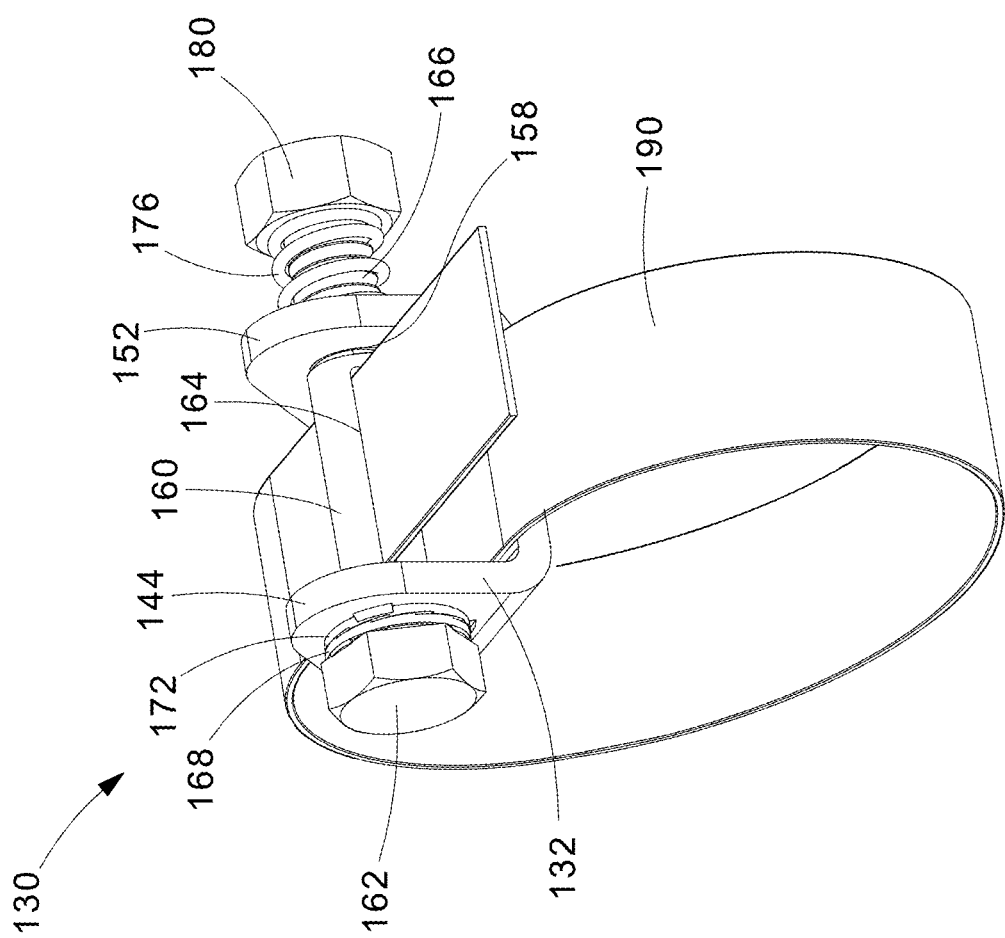
FIG. 12 is a perspective view of the slotted bolt cleat binder of FIG. 11 with the strap feed through the slotted bolt cleat binder.

FIGS. 8-12 illustrate a second embodiment of a slotted bolt cleat binder 130. FIG. 8 illustrates the slotted bolt cleat binder 130 installed on a trefoil cable arrangement 200. As illustrated in FIGS. 9 and 10, the slotted cleat binder 130 includes a yoke 132, a slotted hex head bolt 160, axial ratcheting teeth 168, 172, a tensioner spring 176, a hex nut 180, and a strap 190. The yoke 132 includes a bottom 134 having a front 136, a back 138, a first side 140, and a second side 142. A first side wall 144 extends from the first side 140 perpendicular to the bottom 134 and the second side wall 152 extends from the second side 142 perpendicular to the bottom 134. The first side wall 144 and the second side wall 152 each include an inner wall 146, 154, an outer wall 148, 156, and an opening 150, 158 therethrough, respectively. The openings 150, 158 are aligned and are designed to receive the slotted hex head bolt 160.

The slotted hex head bolt 160 includes a hex head 162 at one end, a slot 164 through the bolt that extends half the length of the bolt 160, and threads 166 at the end opposite the head 162.

Axial ratcheting teeth 168, 172 are welded to the bolt head 162 and the outer wall 148 of the first side wall 144 of the yoke 132, respectively. The ratcheting teeth 168, 172 include angled ramps 170, 174 that become engaged or disengaged through rotation of the hex head 162. The tensioner spring 176 is positioned adjacent to the outer wall 156 of the second side wall 152 of the yoke 132.

To install the cleat binder 130, the cleat binder 130 is positioned on a cushion sleeve (not illustrated) wrapped around a trefoil cable arrangement or cable bundle or the cleat binder 130 is positioned on the trefoil cable arrangement 200 or other cable bundle. The strap 190 is threaded through the slot 164 in the slotted hex head bolt 160. Using common tools, the slotted hex head bolt 160 is then rotated to wrap the strap 190 around the slotted hex head bolt 160 to tension the strap 190. Rotating the bolt 160 causes the ratcheting teeth 168, 172 to disengage by sliding on the angled ramp face 170, 174 until rotated to the next index position where the teeth re-engage and lock in place. Once the desired tension has been reached and the installation is complete, the spring 176 will apply force ensuring the ratcheting teeth 168, 172 will remain in an engaged position.

The slotted bolt cleat binder 130 includes a one step process for tensioning and locking a strap around a cable or cable bundle. The slotted bolt cleat binder 130 is easily installed by common tools with gloves even in confined spaces. The slotted bolt cleat binder 130 receives various sized cables or cable bundles and is inexpensive to manufacture.

Figure 13:
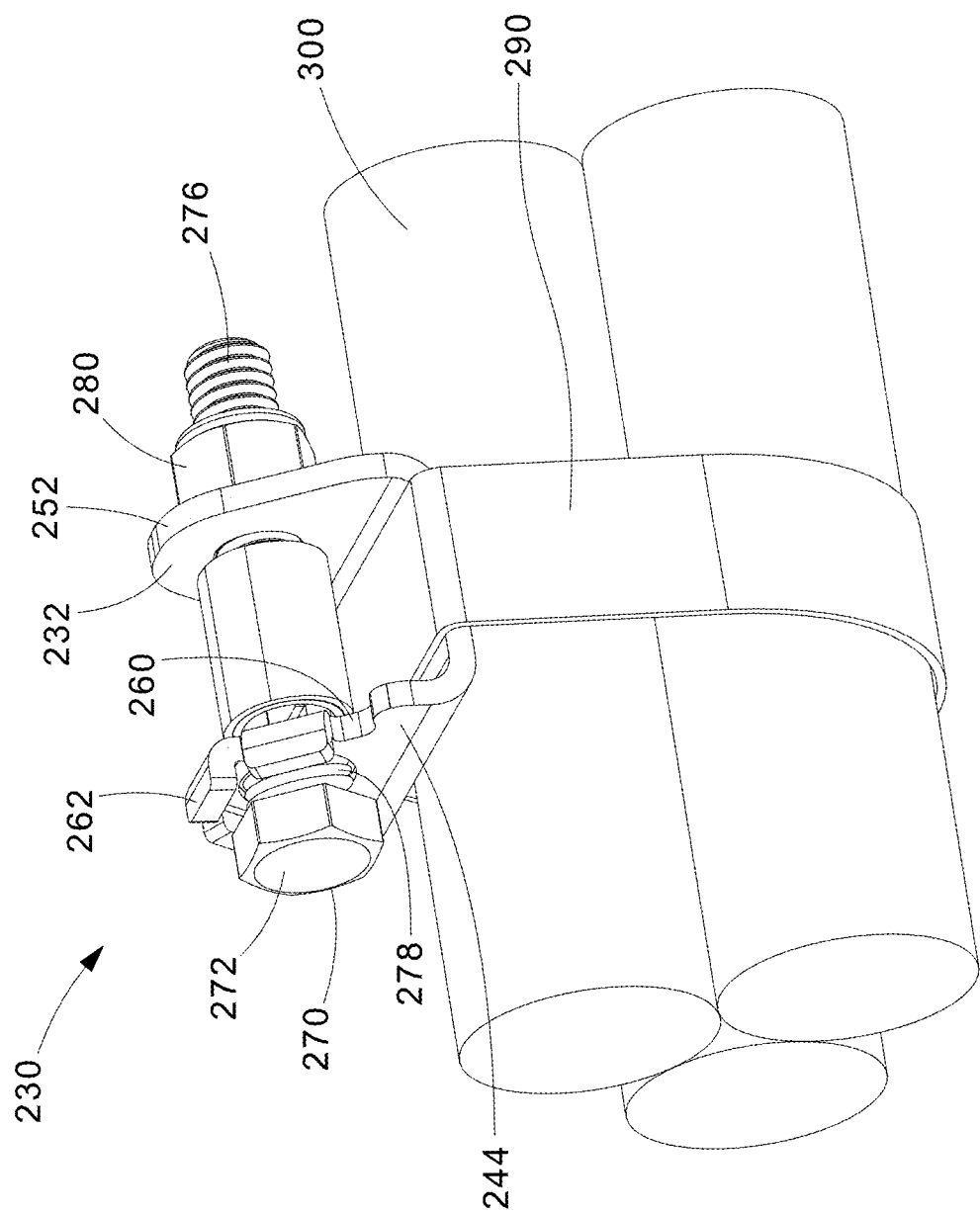
FIG. 13 is a perspective view of a third embodiment of a slotted bolt cleat binder installed on a trefoil cable arrangement.
Figure 14:
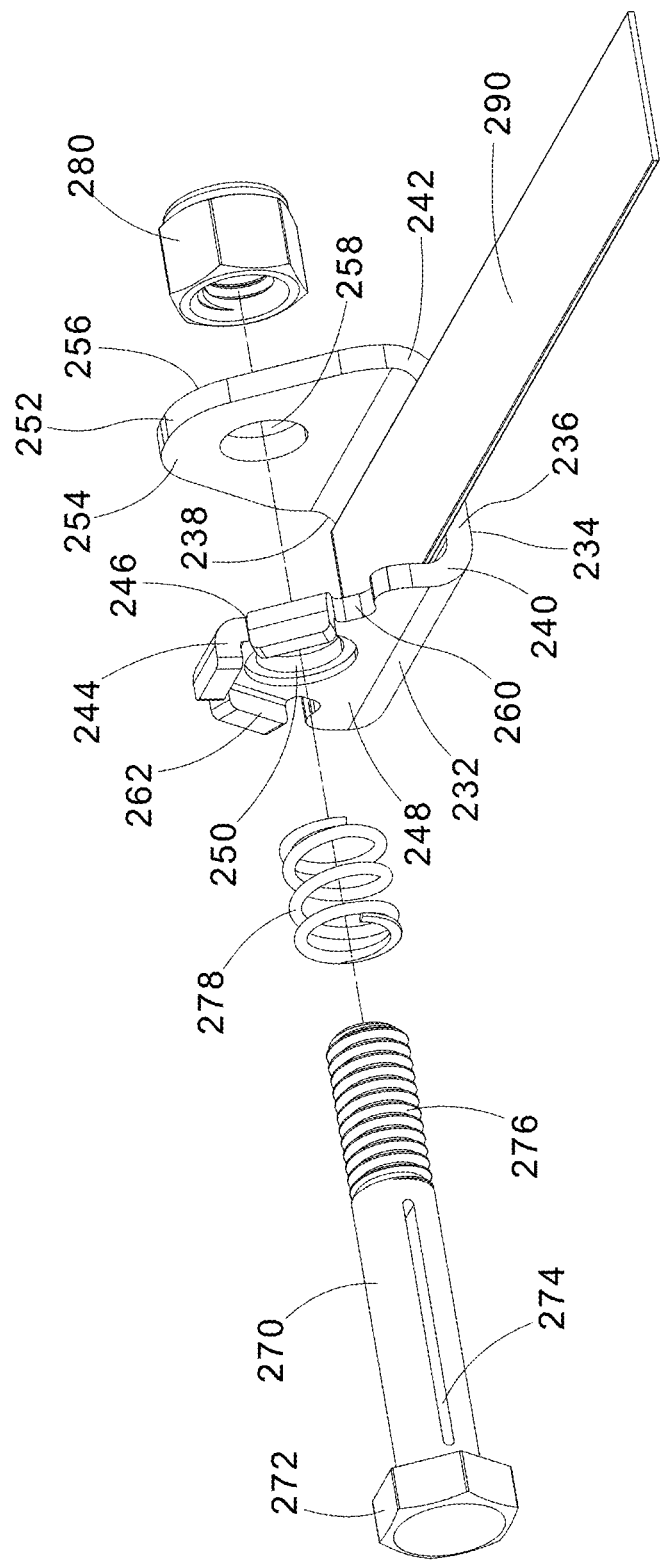
FIG. 14 is a partially exploded left perspective view of the slotted bolt cleat binder of FIG. 13.
Figure 15:
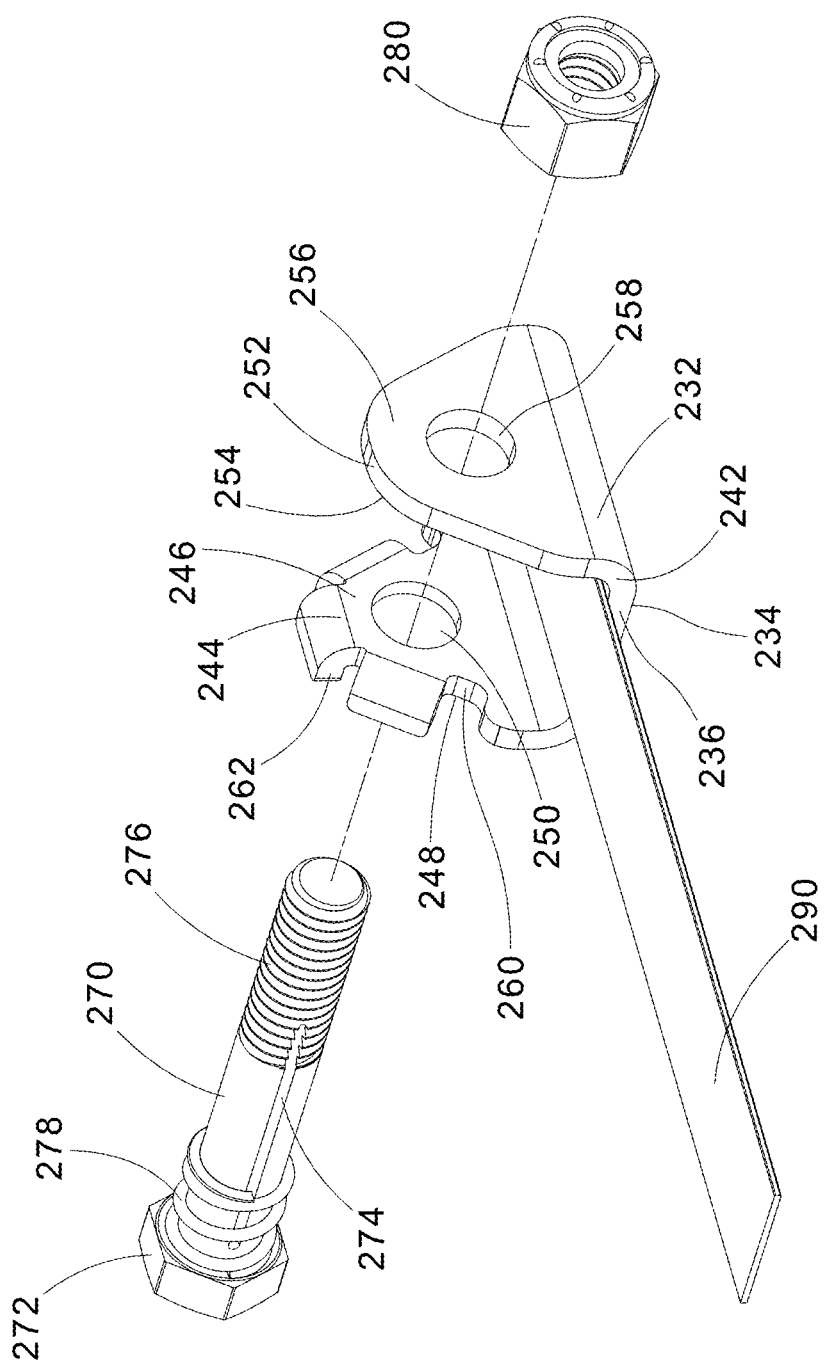
FIG. 15 is a partially exploded right perspective view of the slotted bolt cleat binder of FIG. 13.

FIGS. 13-17 illustrate a third embodiment of a slotted bolt cleat binder 230. FIG. 13 illustrates the slotted bolt cleat binder 230 installed on a trefoil cable arrangement 300. As illustrated in FIGS. 14 and 15, the slotted cleat binder 230 includes a yoke 232, a slotted hex head bolt 270, a compression spring 278 or a conical disc spring (not illustrated), a hex nut 280, and a strap 290. The yoke 232 includes a bottom 234 having a front 236, a back 238, a first side 240, and a second side 242. A first side wall 244 extends from the first side 240 perpendicular to the bottom 234 and the second side wall 252 extends from the second side 242 perpendicular to the bottom 234. The first side wall 244 and the second side wall 252 each include an inner wall 246, 254, an outer wall 248, 256, and an opening 250, 258 therethrough, respectively. The openings 250, 258 are aligned and are designed to receive the slotted hex head bolt 270.

The slotted hex head bolt 270 includes a hex head 272 at one end, a slot 274 through the bolt 270 that extends half the length of the bolt 270, and threads 276 at the end opposite the head 272.

The first side wall 244 includes narrowing indentations 260 and rectangular locators 262 extending from the outer side wall 248 away from the yoke 232. The rectangular locators 262 frame the upper portion of the first side wall 244 to capture the hex head 272 of the slotted hex head bolt 270.

Figure 16:
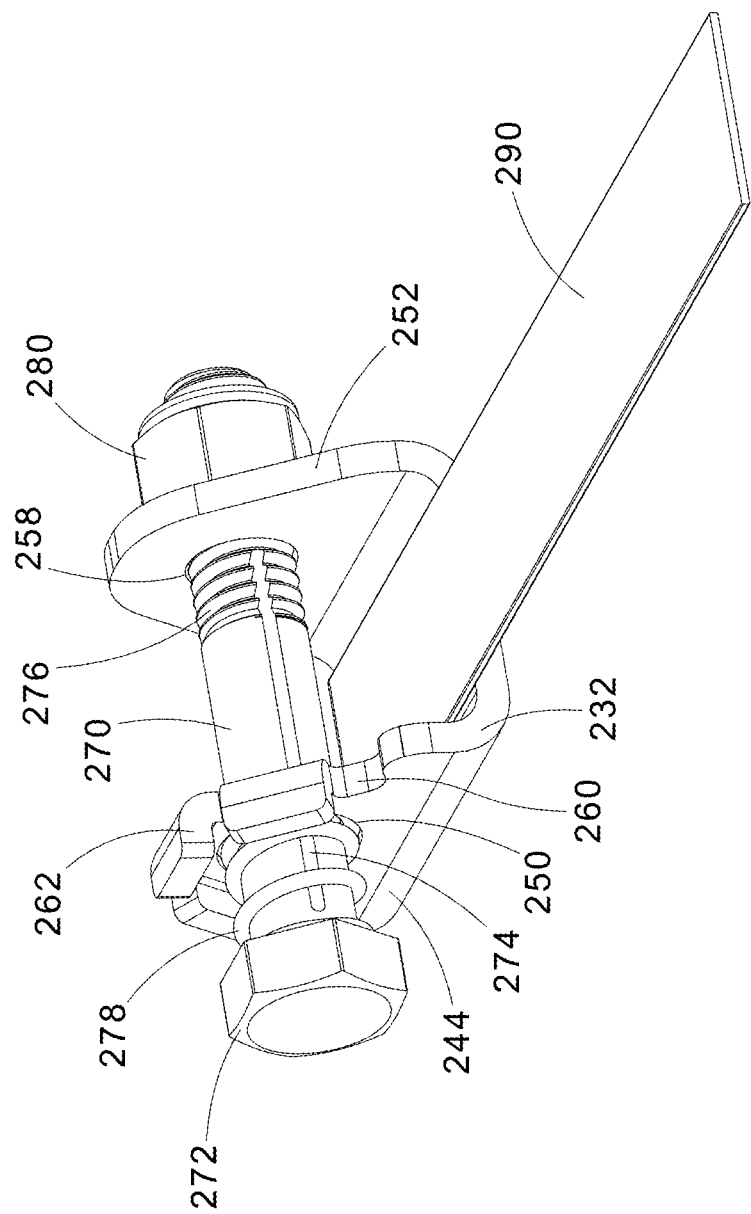
FIG. 16 is a perspective view of the slotted bolt cleat binder of FIG. 13.
Figure 17:
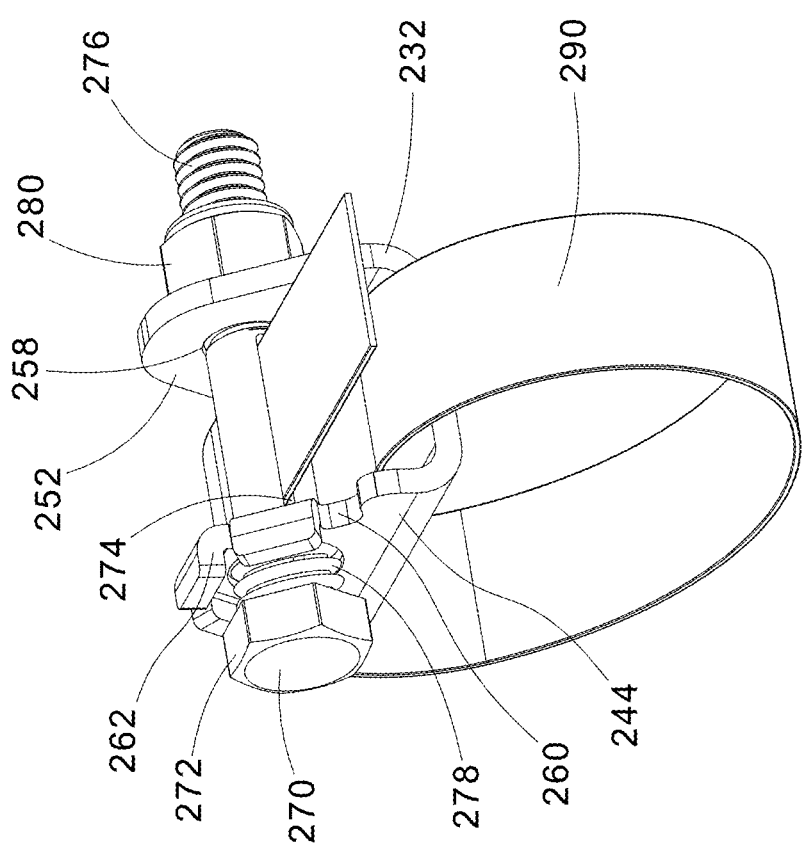
FIG. 17 is a perspective view of the slotted bolt cleat binder of FIG. 16 with the strap feed through the slotted bolt cleat binder.

To install the cleat binder 230, the cleat binder 230 is positioned on a cushion sleeve (not illustrated) wrapped around a trefoil cable arrangement or other cable bundle or the cleat binder 230 is positioned on the trefoil cable arrangement 300 or other cable bundle. The strap 290 is threaded through the slot 274 in the slotted hex head bolt 270. As illustrated in FIG. 16, the spring 278 is sufficiently powerful to stop the hex head 272 of the bolt 270 from prematurely engaging the rectangular locators 262. The strap 290 can be tightened around the trefoil cable arrangement 300 or other cable bundles using a common tool, such as a standard wrench. Once sufficiently tight, a second wrench is used to tighten the nut 280. This action compresses the spring 278 and forces the hex head 272 of the bolt 270 to be captured between the rectangular locators 262. The illustrated design shows three rectangular locators 262 spaced 60 degrees from one another to match the facets of the hex head 272 of the slotted hex head bolt 270, but the design could have any number of locators from 1 to 6 to interact with the hex head 272 of the slotted hex head bolt 270.

Once the slotted hex head bolt 270 has been tightened, the hex head 272 is retained and will resist releasing. The slotted hex head bolt 270 could be reopened to allow for more cables to be installed and then retightened to secure the slotted bolt cleat binder 230, when desired. The slotted bolt cleat binder 230 is easily installed by common tools with gloves even in confined spaces. The slotted bolt cleat binder 230 receives various sized cables or cable bundles and is inexpensive to manufacture.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

What is claimed is:

1. A cleat binder for securing cables, the cleat binder comprising:
 a yoke including a bottom with a front, a back, a first side, and a second side; a first side wall extends from the first side of the bottom, and a second side wall extends from the second side of the bottom, the first side wall and the second side wall each include an outer wall and an inner wall, wherein the inner wall of the first side wall and the inner wall of the second side wall are knurled;
 a slotted hex head bolt extending through the yoke, the slotted hex head bolt having a head and a slot extending through the bolt;
 a nut for securing the slotted hex head bolt on the yoke; and
 a strap fed through the slot of the slotted hex head bolt for securing the cleat binder to cables.

2. The cleat binder of claim 1, wherein the first side wall and the second side wall each include an opening therethrough.

3. The cleat binder of claim 2, wherein the opening in the first side wall and the opening in the second side wall are aligned, and wherein the slotted hex head bolt extends through the opening in the first side wall and the opening in the second side wall.

4. The cleat binder of claim 1, wherein as the nut is tightened on the slotted hex head bolt, the first side wall of the yoke and the second side wall of the yoke bend towards a center of the yoke.

5. The cleat binder of claim 1, further comprising axial ratcheting teeth and a spring.

6. The cleat binder of claim 5, wherein the axial ratcheting teeth are affixed to the head of the slotted hex head bolt and an outer wall of the first side wall of the yoke.

7. The cleat binder of claim 6, wherein the axial ratcheting teeth include angled ramps that become engaged or disengaged through rotation of the slotted hex head bolt.

8. The cleat binder of claim 5, wherein the spring is positioned adjacent to an outer wall of second side wall of the yoke.

9. The cleat binder of claim 5, wherein the axial ratcheting teeth are affixed to the head of the slotted hex head bolt and an outer wall of the first side wall of the yoke, and wherein the spring is positioned adjacent to an outer wall of the second side wall, whereby the spring applies a force to maintain the axial ratcheting teeth in an engaged position.

10. The cleat binder of claim 1, further comprising a compression spring positioned on the slotted hex head bolt.

11. The cleat binder of claim 1, wherein the first side wall has narrowing indentations and rectangular locators, the rectangular locators frame an upper portion of the first side wall.

12. The cleat binder of claim 11, wherein the rectangular locators capture the head of the slotted hex head bolt.

13. The cleat binder of claim 1, wherein a compression spring is positioned on the slotted hex head bolt adjacent to the head and an outer wall of the first side wall of the yoke, and wherein the outer wall of the first side wall of the yoke has rectangular locators extending therefrom, whereby once the strap has been tightened around cables, the nut is tightened on the slotted hex head bolt to compress the spring and force the head of the slotted hex head bolt to be captured by the rectangular locators.

14. A cleat binder for securing cables, the cleat binder comprising:
 a yoke including a bottom with a front, a back, a first side, and a second side; a first side wall extends from the first side of the bottom, and a second side wall extends from the second side of the bottom;
 a slotted hex head bolt extending through the yoke, the slotted hex head bolt having a head and a slot extending through the bolt;
 a nut for securing the slotted hex head bolt on the yoke;
 a strap fed through the slot of the slotted hex head bolt for securing the cleat binder to cables;
 wherein as the nut is tightened on the slotted hex head bolt, the first side wall of the yoke and the second side wall of the yoke bend towards a center of the yoke; and
 wherein the first side wall has an inner wall with a knurled surface and the second side wall has an inner wall with a knurled surface, whereby the knurled inner walls engage the strap to prevent movement during a short circuit event.

* * * * *